US010853393B2

(12) United States Patent
Li (10) Patent No.: US 10,853,393 B2
(45) Date of Patent: Dec. 1, 2020

(54) EXPIRED MAP DATA BASED ANTI-COUNTERFEITING METHOD, APPARATUS, STORAGE MEDIUM AND DEVICE

(71) Applicant: BEIJING BAIDU NETCOM SCIENCE AND TECHNOLOGY CO., LTD., Beijing (CN)

(72) Inventor: Liang Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/067,547

(22) PCT Filed: Aug. 19, 2016

(86) PCT No.: PCT/CN2016/096105
§ 371 (c)(1),
(2) Date: Jun. 29, 2018

(87) PCT Pub. No.: WO2017/118038
PCT Pub. Date: Jul. 13, 2017

(65) Prior Publication Data
US 2020/0250207 A1 Aug. 6, 2020

(30) Foreign Application Priority Data
Jan. 4, 2016 (CN) .......................... 2016 1 0006605

(51) Int. Cl.
G06F 16/29 (2019.01)
G06F 21/16 (2013.01)
G09B 29/00 (2006.01)

(52) U.S. Cl.
CPC .............. *G06F 16/29* (2019.01); *G06F 21/16* (2013.01); *G09B 29/003* (2013.01)

(58) Field of Classification Search
CPC ........ G06F 16/29; G06F 21/16; G09B 29/003
See application file for complete search history.

(56) References Cited

U.S. PATENT DOCUMENTS

| 8,977,719 B1 * | 3/2015 | Miller ..................... G06F 21/10 |
| | | 709/219 |
| 2004/0034467 A1 * | 2/2004 | Sampedro .......... G01C 21/3492 |
| | | 701/533 |

(Continued)

FOREIGN PATENT DOCUMENTS

| CN | 1924875 A | 3/2007 |
| CN | 101295336 A | 10/2008 |

(Continued)

OTHER PUBLICATIONS

International Search Report and Written Opinion, dated Nov. 25, 2016, for PCT/CN2016/096105, 6 pages.

(Continued)

*Primary Examiner* — Babar Sarwar
(74) *Attorney, Agent, or Firm* — Seed IP Law Group LLP (57) ABSTRACT

An expired map data based anti-counterfeiting method, apparatus, storage medium and device. The method includes: acquiring currently expired map data; adding anti-counterfeiting content to the currently expired map data and storing the currently expired map data containing the anti-counterfeiting content; and creating and storing a current anti-counterfeiting map based on basic map data and the currently expired map data containing the anti-counterfeiting content. Using the anti-counterfeiting content added to the currently expired map data as the anti-counterfeiting map data, compared with using false data for anti-counterfeiting in the map data, increases the concealment of the anti-counterfeiting data in the anti-counterfeiting map and improves the anti-counterfeiting effect of the anti-counterfeiting map.

13 Claims, 4 Drawing Sheets

(56) References Cited

U.S. PATENT DOCUMENTS

| | | |
|---|---|---|
| 2006/0178997 A1 | 8/2006 | Schneck et al. |
| 2007/0130172 A1* | 6/2007 | Lee ............... G06F 16/29 |
| 2007/0233695 A1* | 10/2007 | Boudreau ........... G06F 16/29 |
| 2008/0010590 A1* | 1/2008 | Curtis ............ G06F 16/9577 |
| | | 715/246 |
| 2008/0109159 A1* | 5/2008 | Shi ................ G06F 16/51 |
| | | 701/421 |
| 2011/0270798 A1* | 11/2011 | Nagasaka ........... G01C 21/32 |
| | | 707/609 |
| 2012/0313780 A1* | 12/2012 | Stout ............. G08B 27/006 |
| | | 340/540 |
| 2012/0331006 A1* | 12/2012 | Sakairi ............ G06F 16/22 |
| | | 707/781 |
| 2013/0065613 A1* | 3/2013 | Stopel ........... G06F 16/9537 |
| | | 455/456.3 |
| 2015/0058305 A1* | 2/2015 | Scharmann ......... G01C 21/32 |
| | | 707/695 |
| 2016/0275787 A1* | 9/2016 | Kesting ............ G01C 21/32 |
| 2018/0273032 A1* | 9/2018 | Yang ............... G01S 19/43 |

FOREIGN PATENT DOCUMENTS

| | | |
|---|---|---|
| CN | 101452570 A | 6/2009 |
| CN | 103279915 A | 9/2013 |
| KR | 20120088402 A | 8/2012 |

OTHER PUBLICATIONS

Abubahia et al., "Exploiting Vector Map Properties for GIS Data Copyright Protection," *IEEE 27th International Conference on Tools with Artificial Intelligence*, Vietri sul Mare, Italy, Nov. 9-11, 2015, pp. 575-582.

Kim et al. "Copyright Protection of Vector Map Using Digital Watermarking in the Spatial Domain," *The 7th International Conference on Digital Content, Multimedia Technology and its Applications*, Busan, South Korea, Aug. 16-18, 2011, pp. 154-159.

Low et al., "Document Marking and Identification using Both Line and Word Shifting," Proceedings of INFOCOM'95, Boston, Massachusetts, USA, Apr. 2-6, 1995, pp. 853-860.

* cited by examiner

EXPIRED MAP DATA BASED ANTI-COUNTERFEITING METHOD, APPARATUS, STORAGE MEDIUM AND DEVICE

CROSS-REFERENCE TO RELATED APPLICATION

This application is related to and claims the priority from Chinese Application No. 201610006605.0, filed on Jan. 4, 2016, entitled "Expired Map Data Based Anti-counterfeiting Method, Apparatus, Storage Medium and Device," having Beijing Baidu Netcom Science And Technology Co., LTD. as the applicant, the entire disclosure of which is incorporated herein by reference.

TECHNICAL FIELD

Embodiments of the present disclosure relate to the map data anti-counterfeiting technology, for example, an expired map data based anti-counterfeiting method, apparatus, storage medium and device.

BACKGROUND

Usually, a user may download the client of a map product to an electronic product of the user to use the map product. The electronic product is typically a mobile phone, a tablet and the like frequently-used by the user.

At present, companies owning map products all have their company proprietary map data, and usually the companies collect the location information of each place by themselves and add the related location information as the map data to their own map products. However, some companies may misappropriate other companies' map data and merge the misappropriated map data with their own map data to form their map product for the users to use.

SUMMARY

The following is a summary of the subject described in detail in the present specification. The present summary is not intended to limit the protection scope of the claims. Embodiments of the present disclosure provide an expired map data based anti-counterfeiting method, apparatus, storage medium and device, in order to increase the concealment of the anti-counterfeiting map data and improve the anti-counterfeiting effect of the map.

In a first aspect, the embodiments of the present disclosure provide an expired map data based anti-counterfeiting method, including:
  acquiring currently expired map data;
  adding anti-counterfeiting content to the currently expired map data, and storing the currently expired map data containing the anti-counterfeiting content; and
  creating and storing a current anti-counterfeiting map based on basic map data and the currently expired map data containing the anti-counterfeiting content.

In a second aspect, the embodiments of the present disclosure further provide an expired map data based anti-counterfeiting apparatus, including:
  an expired data acquisition module, configured to acquire currently expired map data;
  an anti-counterfeiting content adding module, configured to add anti-counterfeiting content to the currently expired map data, and store the currently expired map data containing the anti-counterfeiting content; and
  an anti-counterfeiting map creation module, configured to create and store a current anti-counterfeiting map based on basic map data and the currently expired map data containing the anti-counterfeiting content.

In a third aspect, the embodiments of the present disclosure further provide a non-volatile computer storage medium, storing one or more modules, wherein the one or more modules, when executed by a device executing an expired map data based anti-counterfeiting method, cause the device to perform the following operations:
  acquiring currently expired map data;
  adding anti-counterfeiting content to the currently expired map data, and storing the currently expired map data containing the anti-counterfeiting content; and
  creating and storing a current anti-counterfeiting map based on basic map data and the currently expired map data containing the anti-counterfeiting content.

In a fourth aspect, the embodiments of the present disclosure provide a device, including:
  one or more processors;
  a memory; and
  one or more programs, the one or more programs being stored in the memory, when executed by the one or more processors, perform the following operations:
  acquiring currently expired map data;
  adding anti-counterfeiting content to the currently expired map data, and storing the currently expired map data containing the anti-counterfeiting content; and
  creating and storing a current anti-counterfeiting map based on basic map data and the currently expired map data containing the anti-counterfeiting content.

By acquiring currently expired map data, adding anti-counterfeiting content to the currently expired map data and storing the currently expired map data containing the anti-counterfeiting content, and creating and storing a current anti-counterfeiting map based on basic map data and the currently expired map data containing the anti-counterfeiting content, the technical solution provided by the embodiments of the present disclosure uses the anti-counterfeiting content added to the currently expired map data as anti-counterfeiting map data. Compared with the prior art in which false data is used for anti-counterfeiting in the map data, this technical solution increases the concealment of the anti-counterfeiting map data in the anti-counterfeiting map and improves the anti-counterfeiting effect of the anti-counterfeiting map. Other aspects will become apparent upon reading and understanding the drawings and the detailed descriptions.

BRIEF DESCRIPTION OF THE DRAWINGS

To describe the technical solution in the embodiments of the present disclosure more clearly, the following briefly introduces the accompanying drawings required for describing the embodiments. Apparently, the accompanying drawings in the following description are merely some embodiments of the present disclosure, for those of ordinary skill in the art, these accompanying drawings may also be modified and replaced without creative work.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure rather than the whole structure are shown in the accompanying drawings.

The First Embodiment

Figure 1:
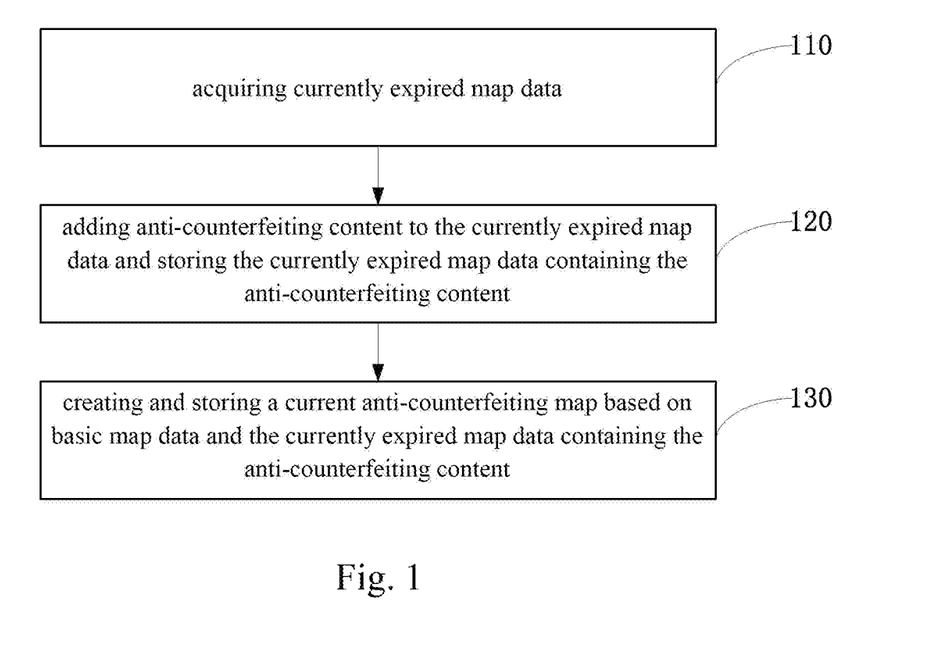
FIG. 1 is a flowchart of an expired map data based anti-counterfeiting method according to the first embodiment of the present disclosure.

FIG. 1 is a flowchart of an expired map data based anti-counterfeiting method according to the first embodiment of the present disclosure. This embodiment may be applicable to the anti-counterfeiting for map data. The method may be executed by an expired map data based anti-counterfeiting apparatus. The apparatus may be implemented by hardware and/or software, and is typically provided in the server of a map application. Referring to FIG. 1, the expired map data based anti-counterfeiting method provided by the present embodiment specifically includes the following:

In S110, currently expired map data is acquired.

Specifically, the currently expired map data refers to map data that does not match the described actual graph. Such as, after the road is repaired and maintained or the building is relocated, the map data describing the original road or the original building becomes the expired map data. In order to improve the timeliness of the currently expired map data, it is preferable to select map expired data having a relatively recent time as the currently expired map data.

Exemplarily, the currently expired map data may be acquired through the following method: determining and acquiring the currently expired map data based on the basic map data and current map data collected by a data collection module, the basic map data referring to map data matches the described actual graph, and the current map data referring to the latest map data collected by the data collection module. The data collection module may be a laser sensor. Specifically, when acquiring the basic map data associated with the current map data, if the current map data is different from the associated basic map data, the associated basic map data may be determined as the expired data. If the map area is set to have multiple lines of expired data, a preset number of pieces of expired data may be selected from the expired data and set as the current expired data.

In addition, the currently expired map data may also be acquired through the following method: acquiring currently expired map data entered by a user.

In S120, anti-counterfeiting content is added to the currently expired map data, and the currently expired map data containing the anti-counterfeiting content is stored.

Specifically, after the currently expired map data is determined, the anti-counterfeiting content may be added to the currently expired map data. The anti-counterfeiting content may be a dithering processing on the road shape data, etc., to store the currently expired map data containing the anti-counterfeiting content to be used by the user in the subsequent anti-counterfeiting verification.

Exemplarily, the adding anti-counterfeiting content to the currently expired map data includes:

A, performing a homophone or similar-form character replacement on part of name data in the currently expired map data.

Since the currently expired map data does not exist in the actual scene any more, if the currently expired map data is used as an identifier for verifying the anti-counterfeit, the anti-counterfeiting effect would be better than that by adding false data. Here, for a geographical position that cannot be searched by searching part of the name in the currently expired map data, the part of name data in the currently expired map data may be replaced by the name data as a homophone or similar-form character, and the actual scene existed before may be obtained by searching the homophone or the similar-form character of the name data. The processing of the name data is not limited herein and may be determined as needed.

B, performing a dithering processing on road shape data in the currently expired map data.

In addition to processing the currently expired map data as described above, a dithering processing on the road shape data in the currently expired map data may also be performed to change the road shape corresponding to the currently expired map data, wherein the road shape data refers to the data of the road shape. Specifically, a dither processing is performed on a certain piece of road shape data in the currently expired map data that does not exist in the actual scene, such as dithering a straight line in the road shape data into an arc. When searching the dithered road shape data in the currently expired map data, a dithering processing result of the dithered road shape data may be seen, to achieve the anti-counterfeiting effect. It should be noted that the processing of the road shape data is not limited to the dithering processing, and other processing such as stretching or compression may be performed as needed.

C, performing a graph adjustment on planar data in the currently expired map data.

In addition to the processing of the currently expired map data as described above, the planar data in the currently expired map data may also be graph-adjusted to change the graph shape corresponding to the currently expired map data, wherein the planar data refers to the shape data of an area in the map, for example, the shape data of areas such as rivers, lakes and green areas. Specifically, the planar data in the currently expired map data that does not exist in the actual scene is subjected to a graph adjustment, such as adjusting the quadrilateral graph in the planar data to a triangle graph. When searching the adjusted planar data in the currently expired map data, the graph adjustment result of the adjusted planar data may be seen. The processing of the planar data is not limited herein, and other processing such as graph twisting may be performed as needed.

The method for adding anti-counterfeiting content to the currently expired map data may include all of the above three methods, or may include any two of the above three methods, or may include any one of the above three methods. Specifically, it may be chosen according to the actual situation.

In S130, a current anti-counterfeiting map is created based on basic map data and the currently expired map data containing the anti-counterfeiting content and stored.

Here, the basic map data refers to the map data that matches the described actual graph. Because the basic map data acquired at different times are different, specifically, the latest updated basic map data and the currently expired map data containing the anti-counterfeiting content may be used together as the current anti-counterfeiting map and the current anti-counterfeiting map needs to be stored for the subsequent anti-counterfeiting verification.

By acquiring currently expired map data, adding anti-counterfeiting content to the currently expired map data, and storing the currently expired map data containing the anti-counterfeiting content, and creating and storing a current anti-counterfeiting map based on basic map data and the currently expired map data containing the anti-counterfeiting content, the technical solution provided by the present embodiment increases the concealment of the anti-counterfeiting data in the anti-counterfeiting map and improves the anti-counterfeiting effect of the anti-counterfeiting map.

Based on the above technical solution, exemplarily, the adding anti-counterfeiting content to the currently expired map data and storing the currently expired map data containing the anti-counterfeiting content may include: acquiring a number of usage for the currently expired map data; removing currently expired map data having a number of usage greater than a count threshold; and adding the anti-counterfeiting content to remaining currently expired map data, and storing the currently expired map data containing the anti-counterfeiting content.

Here, the count threshold may be set according to the user's need. If the count threshold is three times, the currently expired map data is used for more than three times, the currently expired map data may be removed to avoid the frequent use of the currently expired map data, which leads to the reduced concealment of the anti-counterfeiting content.

The Second Embodiment

Figure 2:
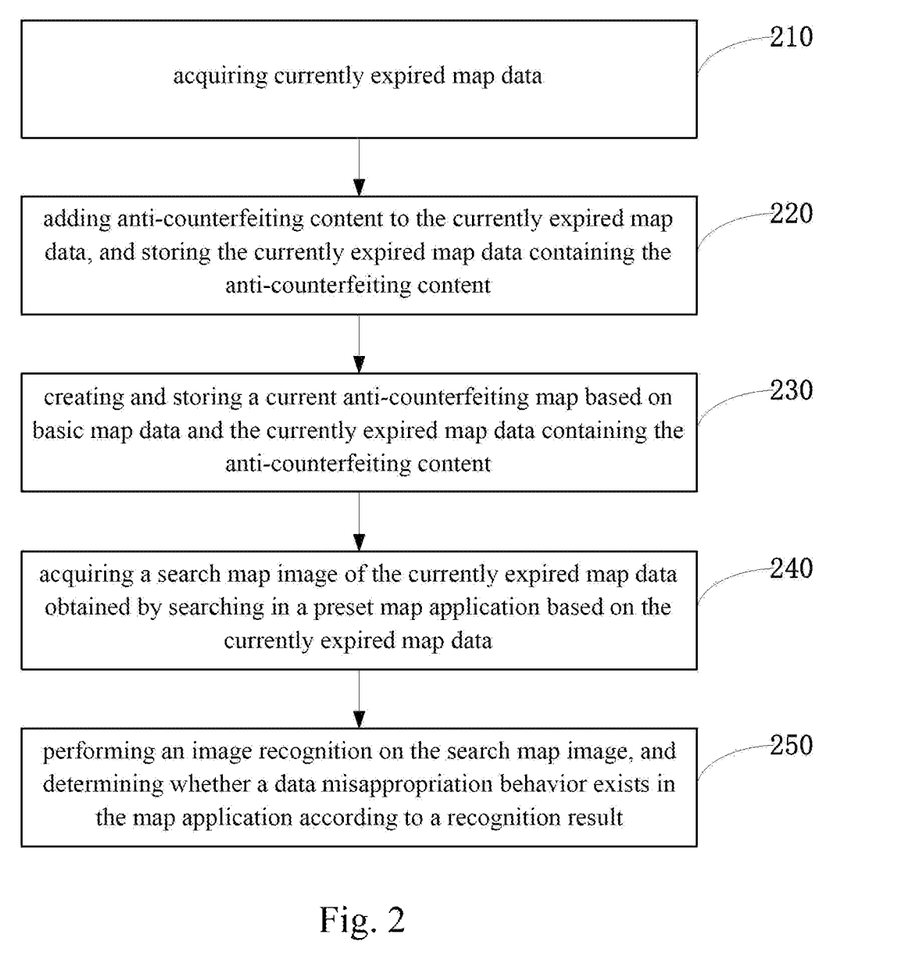
FIG. 2 is a flowchart of an expired map data based anti-counterfeiting method according to the second embodiment of the present disclosure.

The present embodiment provides a new expired map data based anti-counterfeiting method based on the above first embodiment. FIG. 2 is a schematic flowchart of an expired map data based anti-counterfeiting method provided by the second embodiment of the present disclosure. Referring to FIG. 2, the expired map data based anti-counterfeiting method provided by the present embodiment specifically includes the following:

In S210, currently expired map data is acquired.

In S220, anti-counterfeiting content is added to the currently expired map data, and the currently expired map data containing the anti-counterfeiting content is stored.

In S230, a current anti-counterfeiting map is created based on basic map data and the currently expired map data containing the anti-counterfeiting content and stored.

In S240, a search map image of the currently expired map data obtained by searching in a preset map application is acquired based on the currently expired map data.

Specifically, the currently expired map data is searched by using a preset map application to obtain a search map image corresponding to the currently expired map data, and the search map image may also be displayed for used in performing the anti-counterfeiting verification according to the displayed search map image.

In S250, an image recognition is performed on the search map image, and whether a data misappropriation behavior exists in the map application is determined according to a recognition result.

Exemplarily, an image recognition is performed on the search map image, and it is determined according to the recognition result that whether the search map image contains the anti-counterfeiting content associated with the currently expired map data; if yes, it is determined that the data misappropriation behavior exists in the map application; if all search map images do not contain the anti-counterfeiting content, it is determined that the data misappropriation behavior does not exist in the map application.

For example, the anti-counterfeiting content is the dithering processing on the road shape data. If the search map image contains a same dithering processing performed on the road shape data corresponding to the same road shape, it may be determined that the data misappropriation behavior exists in the map data of the map application.

It should be noted that, after the current anti-counterfeiting map is obtained, it may also be manually recognized whether the data misappropriation behavior exists in the to-be-detected map application, that is, perform the S240 and S250 manually. Moreover, the judgment to the misappropriation behavior may need to be verified several times before it can be concluded, and the times of verification is selected according to actual needs.

By adding anti-counterfeiting content to the currently expired map data, creating and storing a current anti-counterfeiting map based on basic map data and the currently expired map data containing the anti-counterfeiting content, the technical solution of the present embodiment further performs an image recognition on the search map image by invoking a search map image of the currently expired map data obtained by searching in a map application, determines whether a data misappropriation behavior exists in the map application according to a recognition result, that is, also realizes an anti-counterfeiting map based data misappropriation behavior recognition method.

The Third Embodiment

Figure 3:
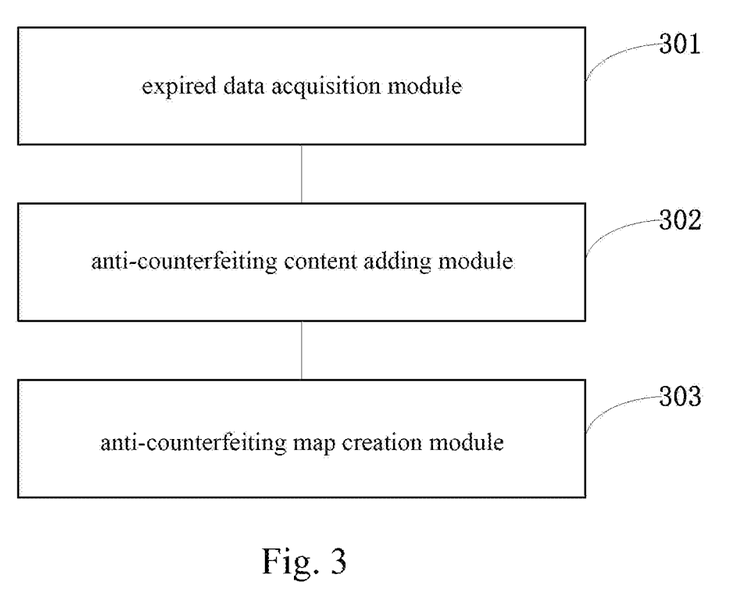
FIG. 3 is a schematic structural diagram of an expired map data based anti-counterfeiting apparatus a according to the third embodiment of the present disclosure.

FIG. 3 is a schematic structural diagram of an provided by embodiment three of the present disclosure. The expired map data based anti-counterfeiting apparatus provided by the present embodiment may be provided in the server of a map application. Referring to FIG. 3, the specific structure of the expired map data based anti-counterfeiting apparatus is as follow:

an expired data acquisition module 301, configured to acquire currently expired map data;

an anti-counterfeiting content adding module 302, configured to add anti-counterfeiting content to the currently expired map data, and store the currently expired map data containing the anti-counterfeiting content; and an anti-counterfeiting map creation module 303, configured to create and store a current anti-counterfeiting map based on basic map data and the currently expired map data containing the anti-counterfeiting content.

Based on the foregoing embodiments, the anti-counterfeiting content adding module 302 may include:

a number of usage acquisition unit, configured to acquire a number of usage for the currently expired map data;

a map data removing unit, configured to remove currently expired map data having a number of usage greater than a count threshold; and an anti-counterfeiting content storing unit, configured to add the anti-counterfeiting content to remaining currently expired map data, and store the currently expired map data containing the anti-counterfeiting content.

Based on the foregoing embodiments, the anti-counterfeiting content adding module 302 may be specifically configured to:

perform a homophone or similar-form character replacement on part of name data in the currently expired map data;
perform a dithering processing on road shape data in the currently expired map data; and/or,
perform a graph adjustment on planar data in the currently expired map data.

Based on the foregoing embodiments, the apparatus may further includes:
a search map image acquisition module, configured to acquire a search map image of the currently expired map data obtained by searching in a preset map application based on the currently expired map data, after creating and storing the current anti-counterfeiting map; and
an image recognition module, configured to perform an image recognition on the search map image, and determine whether a data misappropriation behavior exits in the map application according to a recognition result.

Based on the foregoing embodiments, the image recognition module may be specifically configured to:
determine whether the search map image contains the anti-counterfeiting content associated with the currently expired map data, according to the recognition result; and if yes, determine the data misappropriation behavior exists in the map application.

Based on the foregoing embodiments, the expired data acquisition module 301 may be specifically configured to:
determine and acquire the currently expired map data, based on the basic map data and current map data collected by a data collection module; or
acquire currently expired map data entered by a user.

The expired map data based anti-counterfeiting apparatus provided by the present embodiment and the expired map data based anti-counterfeiting method provided by any embodiment of the present disclosure belong to the same inventive concept and may perform the expired map data based anti-counterfeiting method provided by any embodiment of the present disclosure, has the corresponding functional modules and beneficial effects of performing the expired map data based anti-counterfeiting method. For technical details not described in detail in the present embodiment, reference may be made to the expired map data based anti-counterfeiting method provided by any embodiment of the present disclosure.

The Fourth Embodiment

The present embodiment provides a non-volatile computer storage medium. The non-volatile computer storage medium stores one or more modules, wherein the one or more modules, when executed by a device executing an expired map data based anti-counterfeiting method, cause the device to perform the following operations:
acquiring currently expired map data;
adding anti-counterfeiting content to the currently expired map data, and storing the currently expired map data containing the anti-counterfeiting content; and
creating and storing a current anti-counterfeiting map based on basic map data and the currently expired map data containing the anti-counterfeiting content.

When the storage medium executes the method, the adding anti-counterfeiting content to the currently expired map data, and storing the currently expired map data containing the anti-counterfeiting content, specifically may include:
acquiring a number of usage for the currently expired map data;
removing currently expired map data having a number of usage greater than a count threshold; and
adding the anti-counterfeiting content to remaining currently expired map data, and storing the currently expired map data containing the anti-counterfeiting content.

When the storage medium executes the method, the adding anti-counterfeiting content to the currently expired map data, specifically may include:
performing a homophone or similar-form character replacement on part of name data in the currently expired map data;
performing a dithering processing on road shape data in the currently expired map data; and/or,
performing a graph adjustment on planar data in the currently expired map data.

When the storage medium executes the method, after creating and storing a current anti-counterfeiting map, it may further include:
acquiring a search map image of the currently expired map data obtained by searching in a preset map application based on the currently expired map data; and
performing an image recognition on the search map image, and determining whether a data misappropriation behavior exists in the map application according to a recognition result.

When the storage medium executes the method, the performing an image recognition on the search map image, and determining whether a data misappropriation behavior exists in the map application according to a recognition result, specifically may include:
determining whether the search map image contains the anti-counterfeiting content associated with the currently expired map data, according to the recognition result; and if yes, determining the data misappropriation behavior exists in the map application.

When the storage medium executes the method, the acquiring currently expired map data, specifically may include:
determining and acquiring the currently expired map data, based on the basic map data and current map data collected by a data collection module; or
acquiring currently expired map data entered by a user.

The Fifth Embodiment

Figure 4:
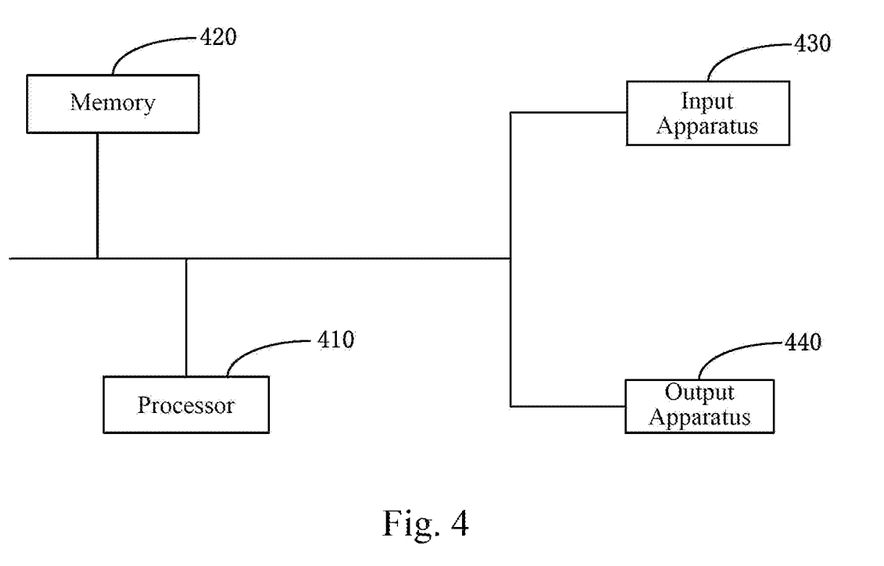
FIG. 4 is a schematic diagram of a hardware structure of a device for executing an expired map data based anti-counterfeiting method according to the fifth embodiment of the present disclosure.

FIG. 4 is a schematic diagram of a hardware structure of a device for executing an expired map data based anti-counterfeiting method according to the fifth embodiment of the present disclosure. Referring to FIG. 4, the device may include:
one or more processors 410, and one processor 410 is taken as an example in FIG. 7;
a memory 420; and one or more modules.

The device may further include: an input apparatus 430 and an output apparatus 440. The processors 410, the memory 420, the input apparatus 430 and the output apparatus 440 may be connected via a bus or in other manners. FIG. 4 takes the connection via a bus as an example.

As a computer readable storage medium, the memory 420 may be used for storing software programs, computer executable programs and modules, for example, program instructions/modules corresponding to the expired map data based anti-counterfeiting method in the embodiments of the present disclosure (for example, the expired data acquisition module 301, the anti-counterfeiting content adding module 302 and the anti-counterfeiting map creation module 303 in the expired map data based anti-counterfeiting apparatus as shown in FIG. 3). The processor 410 runs the software programs, instructions, and modules stored in the memory 420 to execute various function applications and data processing of the device, so as to implement the expired map data based anti-counterfeiting method as discussed in the above method embodiment.

The memory 420 may include a program storage area and a data storage area. The program storage area may store an operating system and an application program for at least one function. The data storage area may store data created according to the use of the terminal device, and the like. In addition, the memory 420 may include a high speed random access memory, and may further include a non-volatile memory, for example, at least one magnetic disk storage device, a flash memory device, or other non-volatile solid state storage devices. In some embodiments, the memory 420 may further include memories disposed remote to the processors 410. These remote memories may be connected to the terminal device through a network. Examples of the network include, but are not limited to, the Internet, an enterprise intranet, a local area network, a mobile communication network, and a combination thereof.

The input apparatus 430 may be used for receiving input digital or character information, and generating key signal inputs related to user settings of the terminal and the function control. The output apparatus 440 may include a display screen or other display devices.

The one or more modules are stored in the memory 420, and, when executed by the one or more processors 410, perform the following operations:

acquiring currently expired map data;
adding anti-counterfeiting content to the currently expired map data, and storing the currently expired map data containing the anti-counterfeiting content; and
creating and storing a current anti-counterfeiting map based on basic map data and the currently expired map data containing the anti-counterfeiting content.

Alternatively, the adding anti-counterfeiting content to the currently expired map data, and storing the currently expired map data containing the anti-counterfeiting content, includes:

acquiring a number of usage for the currently expired map data;
removing currently expired map data having a number of usage greater than a count threshold; and
adding the anti-counterfeiting content to remaining currently expired map data, and storing the currently expired map data containing the anti-counterfeiting content.

Alternatively, the adding anti-counterfeiting content to the currently expired map data, includes:

performing a homophone or similar-form character replacement on part of name data in the currently expired map data;
performing a dithering processing on road shape data in the currently expired map data; and/or,
performing a graph adjustment on planar data in the currently expired map data.

Alternatively, after creating and storing a current anti-counterfeiting map, it further includes:

acquiring a search map image of the currently expired map data obtained by searching in a preset map application based on the currently expired map data; and
performing an image recognition on the search map image, and determining whether a data misappropriation behavior exists in the map application according to a recognition result.

Alternatively, the performing an image recognition on the search map image, and determining whether a data misappropriation behavior exists in the map application according to a recognition result, includes:

determining whether the search map image contains the anti-counterfeiting content associated with the currently expired map data, according to the recognition result; and if yes, determining the data misappropriation behavior exists in the map application.

Alternatively, the acquiring currently expired map data, includes:

determining and acquiring the currently expired map data, based on the basic map data and current map data collected by a data collection module; or
acquiring currently expired map data entered by a user.

According to the descriptions of the above embodiments, those skilled in the art may clearly understand that the present disclosure may be implemented by means of software and necessary general-purpose hardware, and may be implemented, obviously, by means of hardware. However, the former is a preferred implementation in most circumstances. Based on such understanding, the technical solution of the present disclosure essentially, or the part contributing to the prior art may be embodied in the form of a software product. The computer software product may be stored in a computer readable storage medium, such as a floppy disk, a Read-Only Memory (ROM), a Random Access Memory (RAM), a flash memory, a hard disk or an optical disk of a computer, and includes several instructions for enabling a computer device (which may be a personal computer, a server, or a network device, and the like) to execute the method described in the embodiments of the present disclosure.

It should be noted that, in the above embodiments of the expired map data based anti-counterfeiting apparatus, the units and modules included are merely divided according to a functional logic, but the present disclosure is not limited to the above division, as long as the corresponding functions can be achieved. In addition, the specific names of the functional units are merely used for distinguishing, and are not intended to limit the protection scope of the present disclosure.

The above descriptions are merely specific embodiments of the present disclosure, and the protection scope of the present disclosure is not limited thereto. Any changes or replacements that can be easily conceived of by those skilled in the art within the technical scope disclosed by the present disclosure should be covered by the protection scope of the present disclosure. Therefore, the protection scope of the present disclosure should be based on the protection scope of the claims.

What is claimed is:

1. An expired map data based anti-counterfeiting method, comprising:
   acquiring currently expired map data;
   adding anti-counterfeiting content to the currently expired map data, and storing the currently expired map data containing the anti-counterfeiting content; and
   creating and storing a current anti-counterfeiting map based on basic map data and the currently expired map data containing the anti-counterfeiting content.

2. The method according to claim 1, wherein the adding anti-counterfeiting content to the currently expired map data, and storing the currently expired map data containing the anti-counterfeiting content, comprises:
  acquiring a number of usage for the currently expired map data;
  removing the currently expired map data having the number of usage greater than a count threshold; and
  adding the anti-counterfeiting content to remaining currently expired map data, and storing the currently expired map data containing the anti-counterfeiting content.

3. The method according to claim 1, wherein the adding anti-counterfeiting content to the currently expired map data, comprises:
  performing a homophone or similar-form character replacement on part of name data in the currently expired map data;
  performing a dithering on road shape data in the currently expired map data; and/or,
  performing a graph adjustment on planar data in the currently expired map data.

4. The method according to claim 1, after creating and storing a current anti-counterfeiting map, the method further comprising:
  acquiring a search map image of the currently expired map data obtained by searching in a preset map application based on the currently expired map data; and
  performing an image recognition on the search map image, and determining whether a data misappropriation behavior exists in the preset map application according to a recognition result.

5. The method according to claim 4, wherein the performing an image recognition on the search map image, and determining whether a data misappropriation behavior exists in the preset map application according to a recognition result, comprises:
  determining whether the search map image contains the anti-counterfeiting content associated with the currently expired map data, according to the recognition result; and if yes, determining the data misappropriation behavior exists in the map application.

6. The method according to claim 1, wherein the acquiring currently expired map data, comprises:
  determining and acquiring the currently expired map data, based on the basic map data and current map data collected by a data collection module; or
  acquiring the currently expired map data entered by a user.

7. An expired map data based anti-counterfeiting apparatus, comprising:
  at least one processor; and
  a memory storing instructions, which when executed by the at least one processor, cause the at least one processor to perform operations, the operations comprising:
    acquiring currently expired map data;
    adding anti-counterfeiting content to the currently expired map data, and storing the currently expired map data containing the anti-counterfeiting content; and
    creating and storing a current anti-counterfeiting map based on basic map data and the currently expired map data containing the anti-counterfeiting content.

8. The apparatus according to claim 7, wherein the adding anti-counterfeiting content to the currently expired map data, and storing the currently expired map data containing the anti-counterfeiting content, comprises:
  acquiring a number of usage for the currently expired map data;
  removing the currently expired map data having the number of usage greater than a count threshold; and
  adding the anti-counterfeiting content to remaining currently expired map data, and storing the currently expired map data containing the anti-counterfeiting content.

9. The apparatus according to claim 7, wherein the adding anti-counterfeiting content to the currently expired map data, comprises:
  performing a homophone or similar-form character replacement on part of name data in the currently expired map data;
  performing a dithering processing on road shape data in the currently expired map data; and/or,
  performing a graph adjustment on planar data in the currently expired map data.

10. The apparatus according to claim 7, after creating and storing a current anti-counterfeiting map, the operations further comprising:
  acquiring a search map image of the currently expired map data obtained by searching in a preset map application based on the currently expired map data, after creating and storing the current anti-counterfeiting map; and
  performing an image recognition on the search map image, and determining whether a data misappropriation behavior exists in the preset map application according to a recognition result.

11. The apparatus according to claim 10, wherein the performing an image recognition on the search map image, and determining whether a data misappropriation behavior exists in the preset map application according to a recognition result, comprises:
  determining whether the search map image contains the anti-counterfeiting content associated with the currently expired map data, according to the recognition result; and if yes, determining the data misappropriation behavior exists in the map application.

12. The apparatus according to claim 7, wherein the acquiring currently expired map data, comprises:
  determining and acquiring the currently expired map data, based on the basic map data and current map data collected by a data collection module; or
  acquiring the currently expired map data entered by a user.

13. A non-transitory computer medium, storing a computer program, which when executed by one or more processors, causes the one or more processors to perform operations, the operations comprising:
  acquiring currently expired map data;
  adding anti-counterfeiting content to the currently expired map data, and storing the currently expired map data containing the anti-counterfeiting content; and
  creating and storing a current anti-counterfeiting map based on basic map data and the currently expired map data containing the anti-counterfeiting content.

* * * * *